Figure 1:
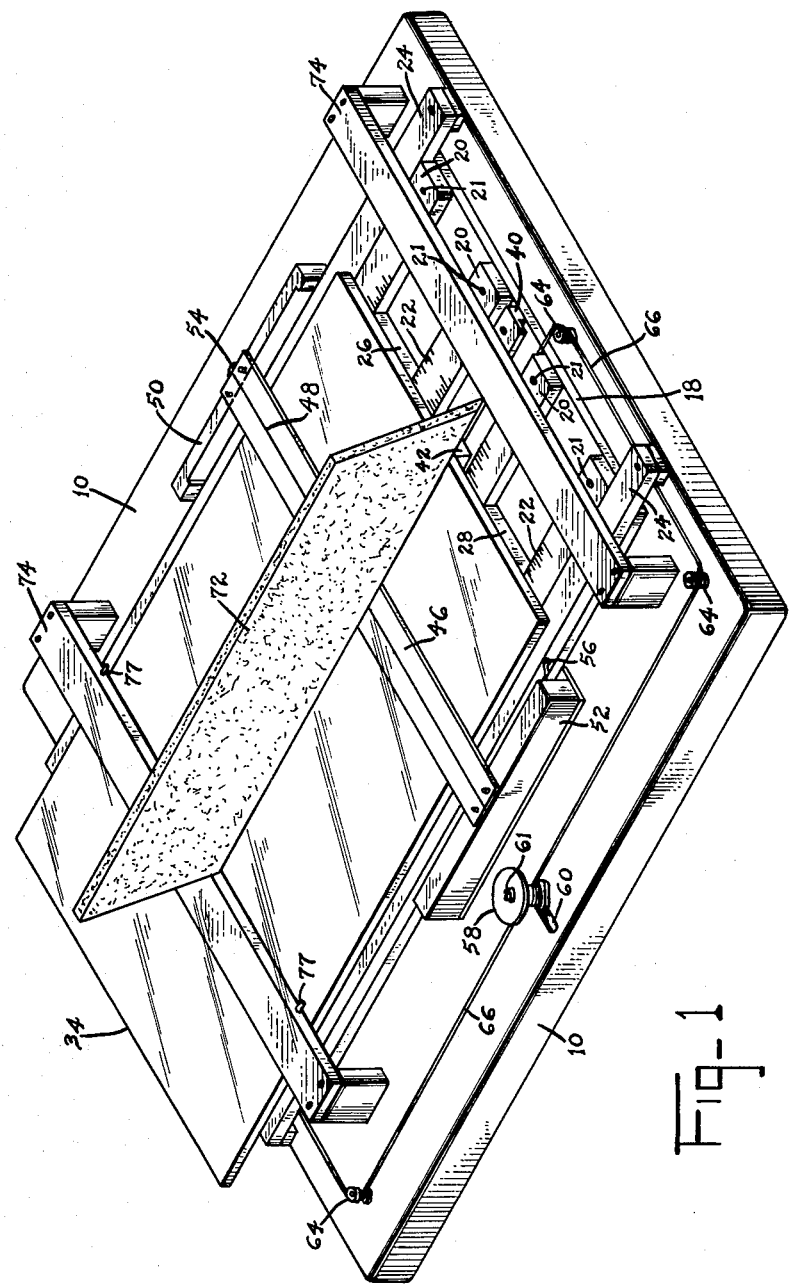

Oct. 24, 1961 F. L. WOOLLEY 3,005,269
SLIDE RULE TRAINER

Filed Feb. 27, 1959 4 Sheets-Sheet 1

INVENTOR.
FRANCIS LOW WOOLLEY
BY
Lawrence S. Epstein
ATTORNEYS

Oct. 24, 1961 F. L. WOOLLEY 3,005,269
SLIDE RULE TRAINER
Filed Feb. 27, 1959 4 Sheets-Sheet 2

INVENTOR.
FRANCIS LOW WOOLLEY
BY
Lawrence S. Epstein
ATTORNEYS

Oct. 24, 1961        F. L. WOOLLEY        3,005,269
SLIDE RULE TRAINER

Filed Feb. 27, 1959                                            4 Sheets-Sheet 3

INVENTOR.
FRANCIS LOW WOOLLEY
BY
Lawrence S. Epstein
ATTORNEYS

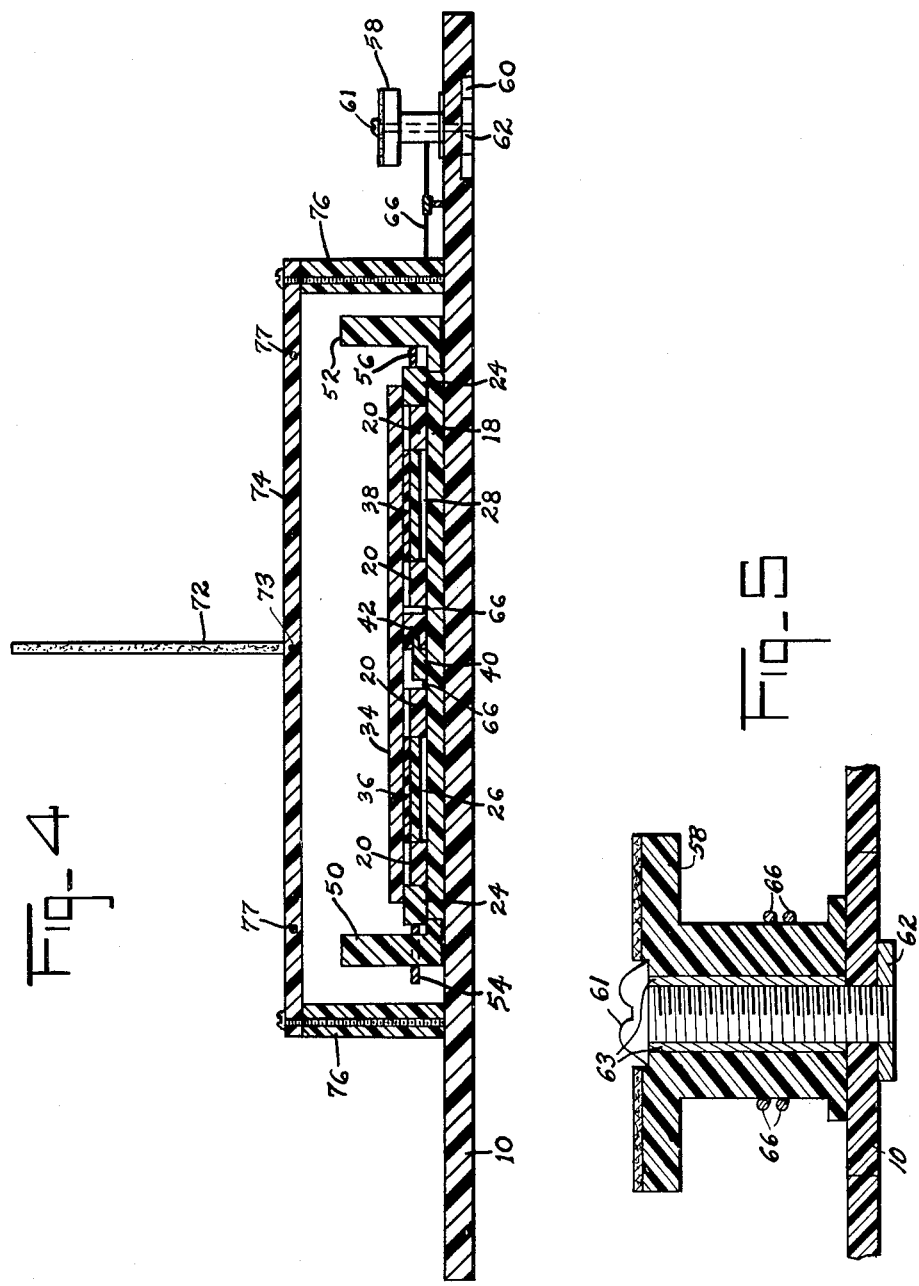

United States Patent Office 3,005,269
Patented Oct. 24, 1961

3,005,269
SLIDE RULE TRAINER
Francis L. Woolley, Port Washington, N.Y., assignor to the United States of America as represented by the Secretary of the Navy
Filed Feb. 27, 1959, Ser. No. 796,179
8 Claims. (Cl. 35—39)
(Granted under Title 35, U.S. Code (1952), sec. 266)

The invention described herein may be manufactured and used by or for the Government of the United States of America for governmental purposes without the payment of any royalties thereon or therefor.

This invention relates generally to a device for training large groups of students at one time by overhead projection of a transparent model, and particularly to a transparent slide rule projected onto a screen and movable through remote means.

Where mass instruction is necessary it is always difficult to teach a large group efficiently. This is particularly true when the instruction includes manipulation of relatively small devices such as a slide rule. Many methods have been used to minimize this difficulty. One such method requires the reproduction of an actual slide rule on a greatly enlarged scale. This slide rule is then hung in a classroom for instruction purposes. The resultant disadvantages inherent in this method of slide rule instruction are an expensive and cumbersome unit which is difficult for the instructor to manipulate and is not clearly visible to all members of a large group.

Another method of instructing large groups in the use of the slide rule which has heretofore been used, involves the use of a transparent slide rule which is projected onto a screen. This method has the following difficulties:

(1) Movement of one section of the slide rule relative to the other section causes scratching of tangent surfaces. These scratches show up in the projection, interfering with and obscuring the projected image.

(2) During manipulation of the movable section of the slide rule, the instructor's hands and fingers appear in the projection obscuring the slide rule image.

The inadequacies and deficiencies of existing training devices are overcome by the instant invention. A completely transparent slide rule, containing photographically reproduced scales of the logarithms and anti-logarithms normally found on the front and reverse sides of a conventional slide rule is projected in magnified form on a screen. Thus, the equivalent of an enlarged slide rule is obtained without being accompanied by an increase in the actual size of the demonstration model. In addition, manipulation of the movable section does not cause scratches, which obscure or impair the projected image, to appear on the projected faces of the slide rule. The instant invention also permits manipulation of the movable section without projection of the instructor's fingers or hands. Other advantages of this invention over existing devices are found in the means provided for fine adjustment of the movable slide rule section and the slide rule cursor.

An object of the invention is to provide a training device that is capable of being used in large classrooms, for teaching the use of a slide rule to a large number of students simultaneously.

Another object of the invention is to provide an improved transparent slide rule for projection of its image on a screen.

Another object of the present invention is to provide a small, easily manipulated, inexpensive slide rule to teach a large group at one time.

Another object of the invention is to provide a slide rule demonstrator capable of being manipulated without the instructor's hands or fingers obscuring the slide rule indicia.

Another object of the invention is to provide, in a transparent slide rule for projection of its image on a screen, a movable section, said movement projecting onto the screen without the projected surfaces of the slide rule touching during movement so as to result in scratching of the projected surfaces.

Another object of the invention is to provide a slide rule demonstrator having fine adjustment means for the cursor and movable slide rule section.

A further object of the invention is to provide a slide rule demonstrator capable of projection of an accurate slide rule image on a screen.

Figure 2:
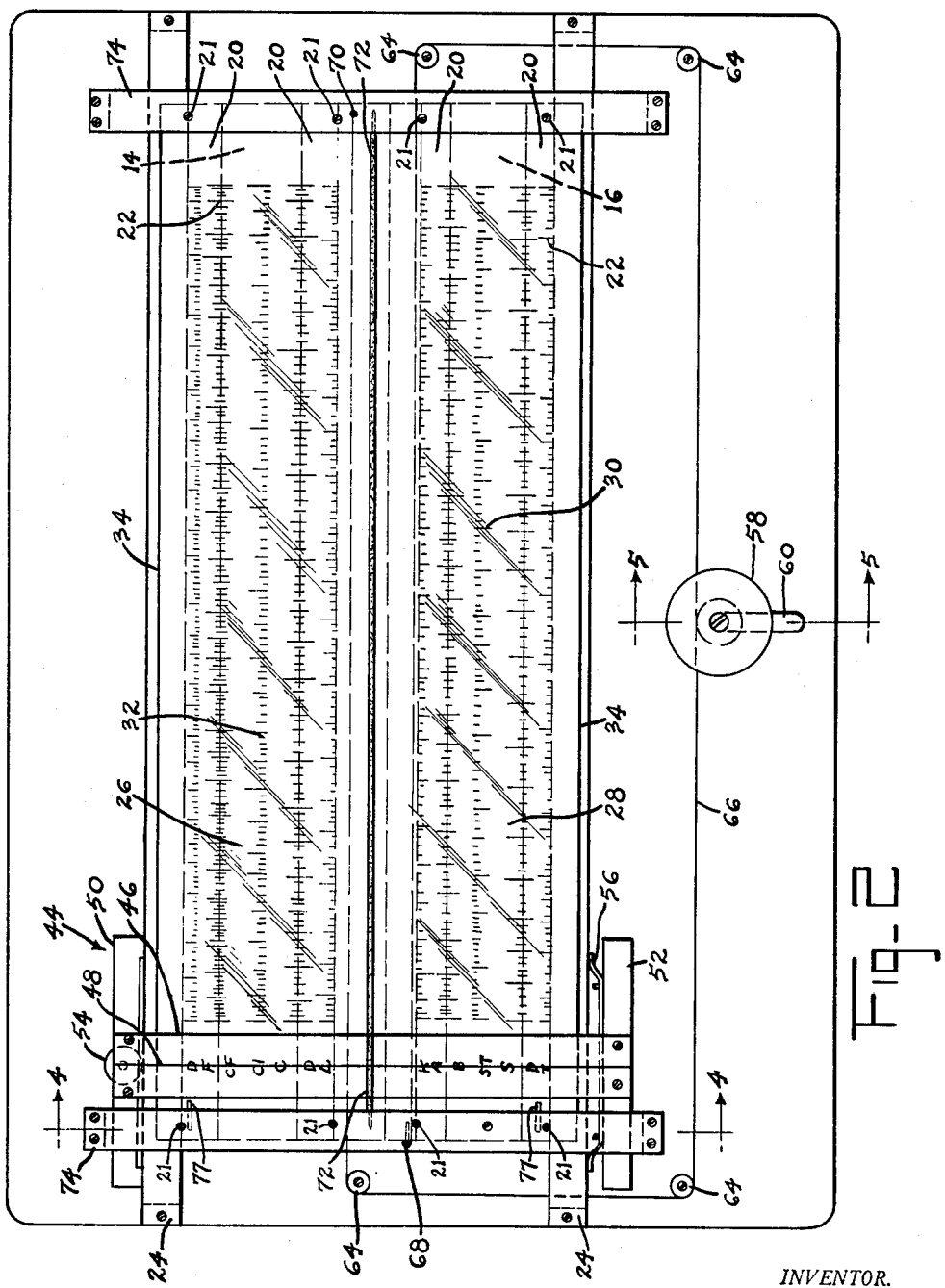
Figure 2:
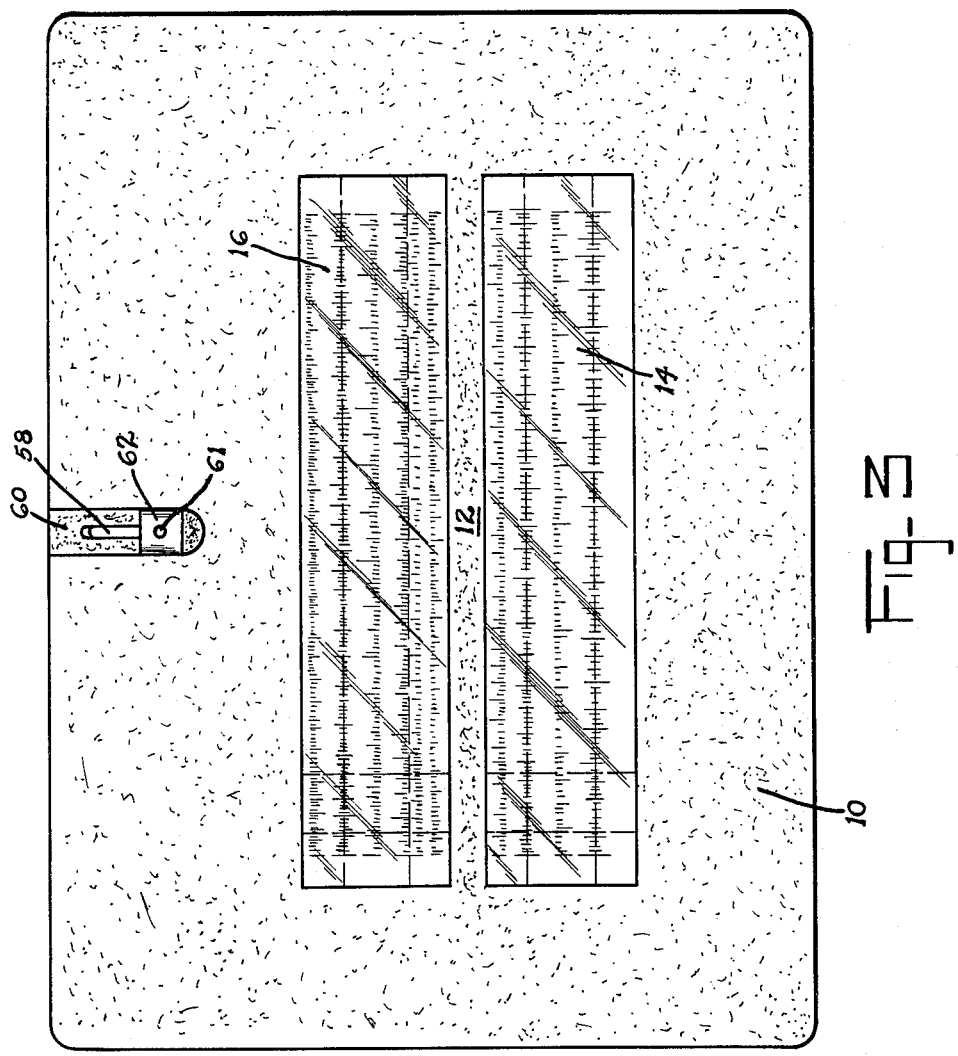

Other objects and many of the attendant advantages of this invention will be readily appreciated as the same becomes better understood by reference to the following detailed description when considered in connection with the accompanying drawings wherein:

FIGURE 1 is a perspective view of the slide rule demonstrator,
FIGURE 2 is a top plan view of the slide rule demonstrator of the invention,
FIGURE 3 is a bottom plan view of the invention,
FIGURE 4 is a section taken on line 4—4 of FIGURE 2, and
FIGURE 5 is a section taken on line 5—5 of FIGURE 2.

Although the slide rule demonstrator of the invention is preferably made of a transparent plastic material it may also be made of any other clear material such as glass. The slide rule demonstrator comprises a base member 10 for mounting the slide rule elements. The base member 10 is opaque except for two rectangular transparent strips 14 and 16 which are separated by an opaque strip 12. The transparent strips 14 and 16 permit the slide rule members 20 to project on an overhead screen, while the opaque portions of the base member 10 prevent projection of any extraneous matter. In this manner, only the slide rule is visible to the students. A transparent plate 18 is secured to the base member 10 for spacing of slide rule elements and overlies the transparent strips 14 and 16.

Spaced apart parallel slide rule elements 20 are secured to transparent plate 18 at 21 so that the slide rule indicia 22 on their upper surfaces are coplanar. A pair of track members 24 are secured to transparent section 18 abutting upon slide rule elements 20 with their upper surfaces coplanar and slightly elevated with respect to slide rule indicia 22. Transparent medial slide strip members 26 and 28, having slide rule indicia 30 and 32 on their upper surfaces, are slidably held between slide rule elements 20 and are respectively secured to overlying transparent strip 34 through shims 36 and 38. Shims 36 and 38 space slide strip members 26 and 28 so that the slide rule indicia 30 and 32 on their upper surfaces are at all times coplanar with the slide rule indicia 22 of slide rule elements 20. Overlying strip 34 is movable along slightly elevated external members 24 and central track members 40 and 42, which are preferably of the tongue 40 and groove 42 type. Tongue member 40 is secured to transparent base section 18 and groove member 42 is secured to overlying strip 34, thus maintaining all the slide rule indicia 20, 30 and 32 coplanar while permitting longitudinal movement of slide members 26 and 28. Maintaining the slide rule indicia coplanar is an important feature of this invention as this results in an accurate projected image. If the slide rule indicia are not maintained coplanar, the different slide rule scales may vary in length when projected. The arrangement of the track members 20, 40 and 42 and the thickness of slide rule elements 20, 26 and 28 and shims 34 and 36 are such that overlying transparent strip 34 does not contact slide rule elements 20 and movable elements 26 and 28 do not contact transparent base section 18. This is an important feature of this invention as continuous contacting of the transparent surfaces with each other results in scratches which impair the projected image.

Cursor or rider 44 preferably includes transparent transverse member 46 having hairline 48 engraved on its lower surfaces, L-shaped side members 50 and 52, finger adjustment dial 54 and spring tension means 56. The L-shaped side members 50 and 52 are connected to transverse member 44 and are adapted to slide underneath track members 24 on the outer edges of transparent base member 18. Spring tension means 56 maintains the cursor at any set position. Finger adjustment dial 54 is used for fine adjustment of the cursor position.

Although the slide rule demonstrator can be operated by manual manipulation of movable slide rule elements 26 and 28, it is desirable not to obscure the projected image during such manipulation. For this reason, remote means are used to position these movable elements 26 and 28. Although many different types of remote manipulation means can be used a preferred type is shown in the figures. Pulley 58 is rotatably secured in slot 60 of base member 10 by nut 62 and bolt 61. Idler wheels 64 are rotatably secured to base member 10 over the opaque coating and positioned so as not to interfere with longitudinal movement of elements 26 and 28 and overlying transparent strip 34. Pulley cord 66 is secured at 68 to the side of overlying transparent strip 34, wound around idler wheels 64 and the smaller diameter of pulley 58 and secured at 70 to the other side of overlying transparent strip 34. The pulley, pulley cord and idler wheels are located over the opaque portion of base member 10, in order to be masked out of the projected image. Pulley wheel 58 is movable in slot 60 to adjust the tension on pulley cord 66. As shown in FIGURE 3, pulley wheel 58 is adjustably secured in slot 60 by bolt 61 and nut 62. In order to adjust the tension on pulley cord 66, bolt 61 is loosened and pulley 58 is moved within slot 60. When the desired tension is obtained, bolt 61 and nut 62 are tightened to secure pulley 58. The bushing 63 which is positioned between bolt 61 and pulley 58 permits rotation of the pulley 58.

Movable opaque cover 72 is pivotally mounted at pivot points 73 on overlying transparent strips 74 which are elevated and secured to base member 10 by members 76.

In operation, the slide rule demonstrator is placed on an overhead projector (not shown) and illuminated from beneath. Both the front and reverse sides of the conventional slide rule have been reproduced on the transparent material. The entire slide rule image is therefore transferred to the screen on an enlarged scale by means of the projector. Rotation of pulley wheel 58 moves the movable slide rule sections longitudinally over twice the length of the slide rule. The cursor hairline 48 is positioned by moving finger wheel 54. Since the pulley wheel, pulley cord, idler wheels and cursor adjustments are over the opaque portions of the base member, the projected image will not be obscured during operation.

If desired, opaque cover 72 can be used to mask one of the two slide rule scales so that it is not projected. In the position shown in the figures cover 72 does not mask either of the slide rule scales. Pins 77 mounted in overlying strip 74 act as stops for cover 72.

Obviously many modifications and variations of the present invention are possible in the light of the above teachings. It is therefore to be understood that within the scope of the appended claims the invention may be practiced otherwise than as specifically described.

What I claim is:

1. A slide rule demonstrator for an overhead projector comprising spaced apart substantially parallel transparent side members, and a movable transparent strip with a depending transparent flange, said transparent strip overlying said side members and being somewhat wider than the space between said side members, said transparent strip and said flange being substantially equal in length to said side members, said flange riding between both side members, with slide rule indicia on the upper faces of said side members and on said dependent flange, the indicia on said side members and dependent flange being in the same plane, and a transparent cursor movably mounted and retained over said side members and said overlying transparent strip and depending flange, and remote manipulation means mounted on said slide rule demonstrator and operatively connected to said movable transparent strip for movement thereof.

2. A slide rule demonstrator for an overhead projector comprising spaced apart substantially parallel transparent side members, track members external to, contiguous to and substantially equal in length to said side members, and a movable transparent strip overlying said track and side members with a depending transparent flange, said flange and overlying strip being substantially equal in length to said side members and riding between both side members, said transparent overlying strip riding on said track members and said track members being slightly elevated with respect to said side members whereby said transparent planar strip is maintained out of contact with the faces of said side members, slide rule indicia on the upper faces of said side members and on said dependent flange, the indicia on said side members and dependent flange being in the same plane, and a transparent cursor movably mounted and retained over said side members and said overlying transparent strip and depending flange, and remote manipulation means mounted on said slide rule demonstrator and operatively connected to said movable transparent strip for movement thereof.

3. A slide rule demonstrator for an overhead projector comprising a planar base having partly transparent and partly opaque portions, a planar transparent section mounted over the transparent portion of said planar base, track means and transparent rectangular strips extending upward from said planar transparent section, slide rule indicia on the upper faces of said transparent rectangular strips, a transparent relatively thin planar strip overlying said base and slidably held on said track means for longitudinal movement on said track means, said track means being slightly elevated with respect to said slide rule indicia on the base mounted transparent rectangular strips whereby said transparent planar strip is maintained out of contact with faces of said transparent rectangular strips, said track means lying over the opaque portions of said planar base, transparent rectangular strips extending downward from said overlying transparent strip and having slide rule indicia on their upper faces and being spaced from said overlying strip so that the slide rule indicia on their upper faces are in the same plane as the slide rule indicia on the faces of the transparent rectangular strips extending upward from the base mounted transparent planar strip, and a transparent cursor movably coupled to and retained by said track means and overlying said transparent strip and base, and remote manipulation means mounted on said slide rule demonstrator and operatively connected to said planar transparent section for movement thereof.

4. The structure of claim 3 wherein the cursor comprises a hairline inscribed rectangular transparent strip transverse to the side and track strips, L-shaped strips movably mounted parallel to the side and track members and attached to said hairline inscribed strip at either end, said L-shaped strips riding external to the track strips and retained thereby so as to permit motion of the hairline longitudinally along the tracks, stops at both ends of both tracks for the cursor, one L-shaped strip having spring tension means for maintaining the hairline at any set position, the other L-shaped strip having a roller for fine finger adjustment of the cursor position.

5. The structure of claim 3 where said strips having slide rule indicia compose the front and back of a standard slide rule, said track means comprising two external slightly elevated tracks and a tongue and groove track mounted midway between the two external tracks, said overlying planar strip and said cursor being independently mounted and movable on said external tracks, one section of said tongue and groove extending upward from the transparent base section and the other section extending downward from the overlying planar section, the overlying planar section and downward extending rectangular slide rule sections and groove section being attached to each other and dependently movable with respect to the base member.

6. The structure of claim 3 and an opaque cover mounted on said slide rule and adapted to cut off the projection of one-half of the slide rule.

7. A slide rule demonstrator for an overhead projector and a pulley arrangement for obtaining a mechanical advantage and changing rotational motion into rectilinear motion comprising a slide rule having a rectilinear moving part and a pulley wheel having two diameters, the outer diameter being substantially larger than the inner diameter, being rotatably mounted with its larger diameter uppermost, two idler wheels rotatably mounted equidistant from said pulley wheel, said idler wheels designated as the first and second respectively and being substantially twice as far from each other as from the pulley wheel, a third idler wheel mounted on an imaginary line substantially perpendicular to a base line passing through the first and second idler wheels, said perpendicular intersecting said base line at the first idler wheel, a fourth idler wheel mounted on an imaginary line substantially perpendicular to said base line, said perpendicular intersecting said base line at the second idler wheel, the pulley cord maintained under tension and secured to the rectilinear moving part of said slide rule at the end closest to the fourth idler wheel, said rectilinearly moving object able to move in a direction parallel to said base line for a distance substantially twice the length of said base line, said cord extending across the length of the rectilinear moving object and in sequence movably secured about the third idler wheel and the first idler wheel, then said cord is rotated about the smaller diameter of said pulley and then in sequence secured about the second idler wheel and then the fourth idler wheel, and then extended across the length of the rectilinearly moving object and secured to the end closest to the third idler wheel.

8. The structure of claim 7 wherein said slide rule demonstrator comprises a planar base having partly transparent and partly opaque portions, a planar transparent section mounted over the transparent portion of said planar base, track means and transparent rectangular strips extending upward from said planar transparent section, slide rule indicia on the upper faces of said transparent rectangular strips, a transparent relatively thin planar strip overlying said base and slideably held on said track means for longitudinal movement on said track means, said track means being slightly elevated with respect to said slide rule indicia on the base mounted transparent rectangular strips whereby said transparent planar strip is maintained out of contact with faces of said transparent rectangular strips, said track means lying over the opaque portions of said planar base, transparent rectangular strips extending downward from said overlying transparent strip and having rule indicia on their upper faces and being spaced from said overlying strip so that the slide rule indicia on their upper faces are in the same plane as the slide rule indicia on the faces of the transparent rectangular strips extending upward from the base mounted transparent planar strip, and a transparent cursor movably coupled to and retained by said track means and overlying said transparent strip and base.

References Cited in the file of this patent
UNITED STATES PATENTS

| | | |
|---|---|---|
| 1,802,603 | Herm | Apr. 28, 1931 |
| 2,415,415 | Christen | Feb. 11, 1947 |
| 2,489,790 | Lieberman | Nov. 29, 1949 |
| 2,706,913 | Trossi | Apr. 26, 1955 |
| 2,828,635 | Johnson et al. | Apr. 1, 1958 |
| 2,841,888 | Grimmer | July 8, 1958 |
| 2,841,889 | Coale et al. | July 8, 1958 |